United States Patent [19]

Nadkarni et al.

[11] Patent Number: 5,008,825
[45] Date of Patent: Apr. 16, 1991

[54] APPARATUS AND METHODS FOR AUTOMATICALLY MAINTAINING AIRCRAFT TRACK ANGLE

[76] Inventors: Arun A. Nadkarni, 12836 NE. 135th St., Kirkland, Wash. 98034; Mithra M. K. V. Sankrithi, 4554 143rd Ave., SE., Bellevue, Wash. 98006

[21] Appl. No.: 346,432

[22] Filed: May 1, 1989

[51] Int. Cl.$^5$ ............................................. B60C 13/18
[52] U.S. Cl. .................................. 364/434; 364/435; 244/178; 244/181
[58] Field of Search ............... 364/434, 432, 433, 435; 73/178 R; 244/177, 178, 180, 181, 221, 223

[56] References Cited

U.S. PATENT DOCUMENTS

| | | |
|---|---|---|
| 3,521,839 | 7/1970 | Diani . |
| 3,750,985 | 8/1973 | Wheldon . |
| 3,807,666 | 4/1974 | Devlin . |
| 3,837,603 | 9/1974 | Schultz et al. . |
| 3,862,717 | 1/1975 | Lehfeldt . |
| 4,006,870 | 2/1977 | Boone et al. . |
| 4,094,479 | 6/1978 | Kennedy, Jr. . |
| 4,244,541 | 1/1981 | Dorn ................................... 244/221 |
| 4,354,240 | 10/1982 | Olive . |
| 4,392,203 | 7/1983 | Fischer et al. ...................... 364/434 |
| 4,420,808 | 12/1983 | Diamond et al. .................... 364/434 |
| 4,533,999 | 8/1985 | Lambregts . |
| 4,603,388 | 7/1986 | Griffith et al. ...................... 244/180 |
| 4,642,774 | 2/1987 | Centala et al. ...................... 364/434 |
| 4,758,958 | 7/1988 | von Gersdorff ..................... 364/434 |

FOREIGN PATENT DOCUMENTS 116819 7/1984 Japan .

Primary Examiner—Parshotam S. Lall
Assistant Examiner—Tyrone Queen
Attorney, Agent, or Firm—R. H. Sproule; B. A. Donahue

[57] ABSTRACT

There is provided a controller for aiding a pilot to control an airplane's track over the ground. While the airplane is in the air, a lateral control subsystem is provided for automatically holding the aircraft aligned with a desired track angle. Control is initiated when the pilot places the airplane in a wings level condition and centers his roll axis controller (e.g., wheel or stick). An in-air track rate control subsystem is also provided. While the airplane is on the ground, a directional control subsystem is provided which enables the pilot to command track rate or heading rate with rudder pedal inputs. The track/heading rate commands are integrated to generate track/heading angle commands. Feedback control is used to position the rudder and nosewheel steering as required to make the airplane's actual track/heading follow the track/heading commands. Provisions are made to initialize the in-air lateral and on-ground directional control subsystems to provide smooth transitions during takeoff and landing.

47 Claims, 6 Drawing Sheets

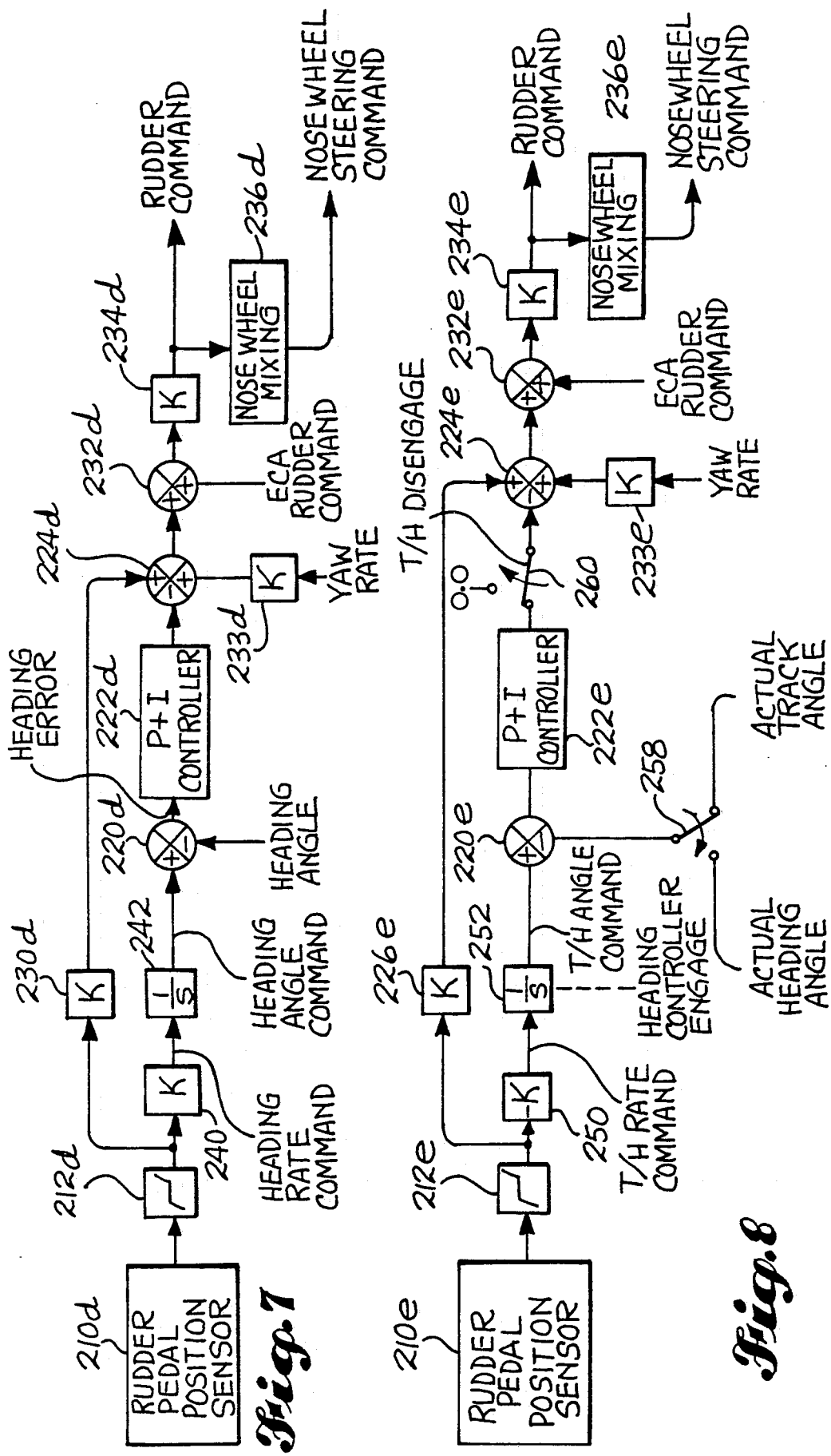

APPARATUS AND METHODS FOR AUTOMATICALLY MAINTAINING AIRCRAFT TRACK ANGLE

TECHNICAL FIELD

The present invention pertains to control systems for automatically maintaining aircraft track angle while the aircraft is in the air, and for controlling aircraft track angle or heading angle while the aircraft is on the ground.

BACKGROUND OF THE INVENTION

The ability to maintain a selected track in flight is a desirable feature in an aircraft. An aircraft travelling along a given ground track from point A to point B may be subjected to in-flight crosswinds which can blow the aircraft off track unless corrections are made by the flight crew. The corrections typically require the aircraft to be headed into the wind to the extent necessary to maintain the aircraft along the desired ground track. An angle between the actual track of the aircraft and true north or magnetic north is known as the true track angle or magnetic track angle, respectively. An aircraft flying along a straight line ground track will maintain a constant track angle.

Conventional autopilot control systems include provisions for holding an aircraft at a fixed track angle. The flight crew select the numerical value of the desired track angle at an autopilot mode control panel. Certain aircraft such as the Boeing 737 also feature an autopilot having a conventional automatic track angle hold system. In this system when control wheel steering (CWS) is selected, wheel force inputs by the pilot command aircraft roll rate. When the pilot removes all wheel force and the airplane is close to a wings level attitude, track angle hold is automatically engaged. A disadvantage of this conventional CWS control is that the pilot must remove any applied force (essentially take his hands off the control wheel) in order to engage track angle hold. This may be impossible if, for example, the pilot is attempting to hold a pitch attitude. In addition, during certain asymmetric or dynamic flight conditions, zero wheel force may not correspond to zero wheel position (ailerons neutral). For example, during forward slip flight the wheel position must be nonzero because the ailerons need to be deflected even for zero roll rate flight. This is a disadvantage because the pilot sometimes will need to release wheel force when the wheel is not centered in order to engage track angle hold.

Other conventional control systems have been disclosed. For example, U.S. Pat. No. 3,222,013 by Perkins discloses an autopilot system which maintains an aircraft track defined by a radio beam.

U.S. Pat. No 3,361,392 by Doniger et al discloses a control system which performs a crosswind "decrab" maneuver to automatically align an aircraft with a runway prior to landing flare.

The ability to maintain a desired track also is a desirable feature while the aircraft is on the ground. For example, during takeoff roll and landing rollout the desired track normally is along the runway centerline. A crosswind may cause the aircraft to deviate from the runway centerline unless the flight crew make appropriate corrective control inputs. Other environmental conditions such as runway ice can aggravate the crosswind problem by increasing the tendency of the aircraft to deviate from the runway centerline.

Conventional autopilot systems have provided landing rollout control and takeoff flight director guidance. However, in conventional systems when the pilot uses the rudder pedals for on-ground directional control, rudder and nosewheel steering deflections are commanded rather than track or heading rates. This can place a large workload on the pilot when controlling aircraft direction during adverse conditions such as during crosswinds, icy runway, or engine failure conditions.

SUMMARY OF THE INVENTION

The present invention provides feedback control means to facilitate pilot guidance and control of an aircraft along a desired ground track. A track angle hold control subsystem is used in conjunction with a roll rate control system when the aircraft is in flight. A track/heading rate directional control system is used when the aircraft is on the ground and aircraft speed is above a minimum threshold.

During in-air operation, a track angle command is defined and track angle hold is engaged when the pilot centers his roll controller (e.g., wheel) and when the airplane is at a roll angle near that required to maintain track (e.g., near zero roll angle at zero sideslip).

During on-ground operation, a track/heading angle command is defined by integration of the rudder pedal input track/heading rate command. During both in-air and on-ground operation, actual track/heading feedback signals from the aircraft inertial reference system are used to drive track/heading angle error (i.e., command minus actual) towards zero. The in-air track control operates lateral control surfaces (e.g., ailerons, spoilers) while the on-ground track/heading control operates directional controls (e.g., rudder, nosewheel steering).

The in-air track angle hold control subsystem of the present invention overcomes a major deficiency of conventional track angle hold "control wheel steering" by no longer requiring that roll controller (e.g. control wheel) position reflect the actual aileron position. In addition, the on-ground track rate command control subsystem and the heading rate command control subsystem of the present invention ease pilot workload when maintaining directional control during on ground operations, and especially during adverse conditions such as crosswind, icy runway, or engine failure.

BRIEF DESCRIPTION OF THE DRAWINGS

The present invention will be described further in the following Detailed Description in conjunction with the attached drawings, in which:

FIG. 7 is a block diagram of an exemplary on-ground heading rate command directional control system for an aircraft; and FIG. 8 is a block diagram of another exemplary on-ground track rate and heading rate command directional control system for an aircraft.

DETAILED DESCRIPTION OF THE INVENTION

Figure 1:
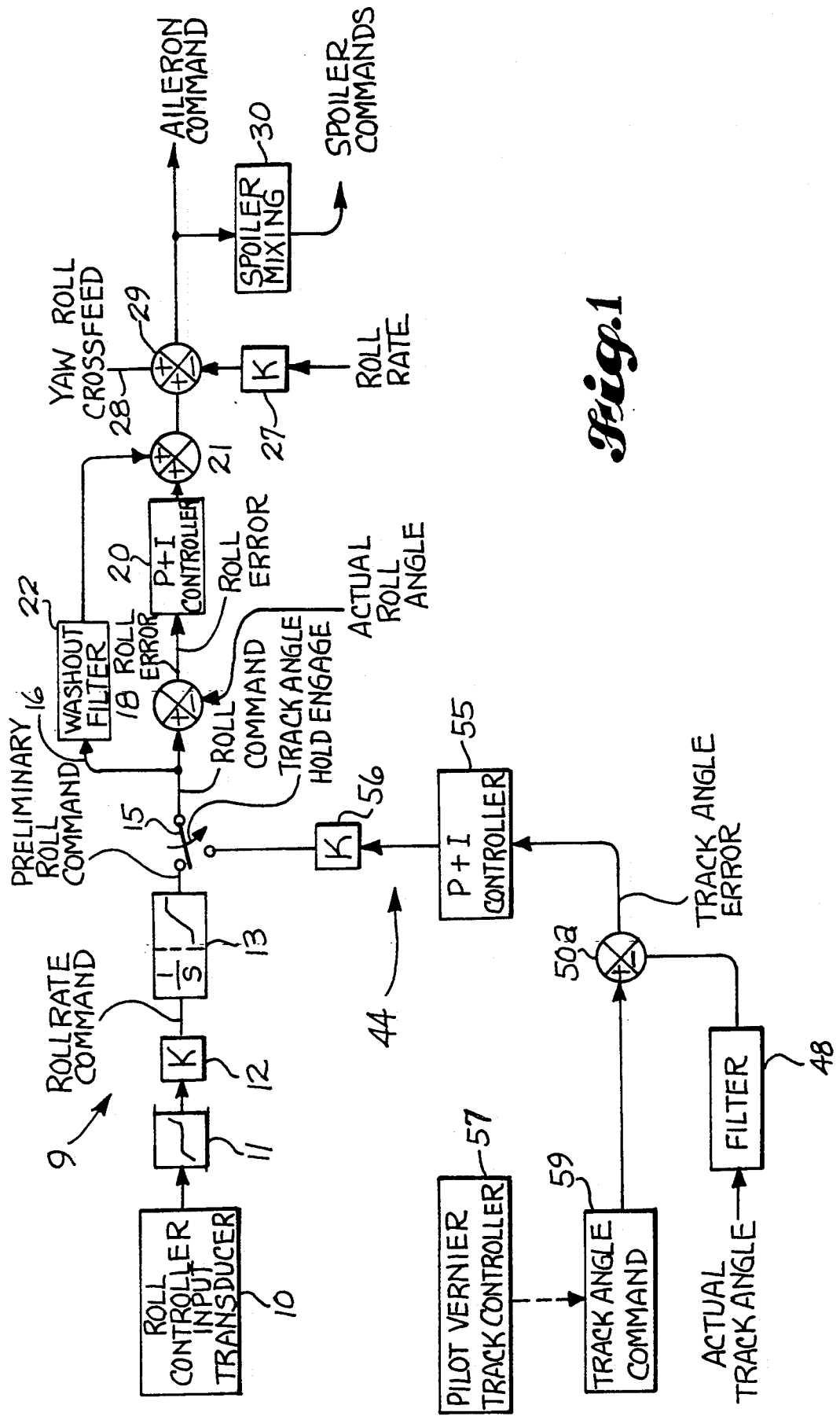
FIG. 1 is a block diagram of an exemplary in-flight aircraft track angle hold control subsystem of the present invention.

Before proceeding with a detailed description of the present invention, a brief overview will be provided. The present invention pertains to a control system which automatically maintains a selected aircraft track angle or a selected heading angle. Actual track angle and heading angle signals are provided from an aircraft inertial reference system in a conventional manner. The control system of the present invention includes an in-flight mode and an on-ground mode which typically is in the form of a software program located in the aircraft flight control or flight management computer. During the in-flight mode the track angle which is to be maintained, hereinafter referred to as the "commanded track angle", is selected by appropriate operation of the pilot's roll controller (which is typically the aircraft control wheel or stick).

To capture a desired track angle, the pilot rolls the aircraft out of a turn and neutralizes (centers) his roll controller when the airplane nears a wings-level attitude where roll angle is near zero. At this time a track angle command is automatically generated and the track angle hold function automatically engages. The track angle command is based upon the actual track angle at the time of roll controller neutralization. The automatic track angle hold function continues until the pilot once again moves his roll controller out of its centered detent position. In this invention the pilot selects the commanded aircraft track angle by centering his roll controller rather than conventional methods of manually dialing in a commanded track angle or zeroing roll controller force for control wheel steering.

During the on-ground control mode, a track angle command or heading angle command signal, whichever the case may be, is generated from a filtered aircraft track angle or heading angle signal existing at the time the aircraft rudder pedals are neutralized. The track angle or heading angle command is automatically maintained until the rudder pedals are moved from their centered detent position. When the rudder pedals are moved, they generate a command track rate or heading rate signal, which is integrated to generate a track angle or heading angle command signal. Track angle or heading angle control and hold are accomplished using a combination of aircraft nosewheel steering and rudder. The nosewheel steering is more effective at lower aircraft speeds, while the rudder is more effective at higher aircraft speeds. The control system of the present invention may be conveniently used for, among other things, assisting the pilot in controlling the aircraft along a runway centerline during landing rollout. Since the pilot is making control inputs, this is referred to as "pilot-in-the-loop" control. For example, an aircraft landing to the left of runway centerline will require a right rudder pedal correction to move the aircraft to the runway centerline, and then a left rudder pedal correction to realign the aircraft with the runway centerline. In conventional control systems, additional rudder pedal corrections by the pilot may be necessary to stabilize the aircraft along the runway centerline. That is, a number of smaller left and right pedal corrections may be needed to establish and maintain the desired airplane track along the runway centerline. However, in the present invention, once the rudder correction is made to align the aircraft with the runway centerline and the rudder pedals are neutralized, the aircraft will be automatically maintained at a track angle or heading angle which aligns the aircraft with the runway centerline with no further rudder pedal inputs being required.

Proceeding now with a more detailed description of the in-flight mode, reference is made to FIG. 1. In an exemplary embodiment, the control system is implemented in redundant aircraft computers such as in conventional flight control computers or flight management computers. A roll rate command control system, generally indicated by the numeral 9, is provided. Outputs from the aircraft roll controller (e.g. wheel, stick, or a minicontroller such as a sidestick) are measured by at least one roll controller input transducer 10 which transmits a signal indicative of the deflection of the roll controller. Transducer 10 may be a linear or rotary variable differential transformer (LVDT, RVDT) or the like. A right deflection of the roll controller is assumed to be positive. The signal from the transducer 10 is passed through a neutral position deadzone block 11 and converted to a roll rate command in a conventional manner by a gain block 12. The gain of block 12 may be fixed, or it may be sheduled as a function of aircraft configuration (e.g., flap and gear position), or as a function of air data parameters (e.g., airspeed, impact pressure).

The roll rate command is passed through a limited integrator 13 to generate a preliminary roll angle command in a conventional manner. The preliminary roll angle command then passes through a switch 15. When the automatic track angle hold function of the present invention is disengaged, switch 15 is in the "up" position (FIG. 1) for conventional system operation. In this manner, the signal from the integrator 13 is passed downstream as a "final" roll angle command. This roll angle command represents the roll angle which the pilot wants the aircraft to achieve, and it will typically be displayed to the pilot on his primary flight display in addition to the conventional display of roll angle. The roll angle command is defined to be positive for right wing down.

A feedback signal of actual roll angle from the aircraft inertial reference system (not shown) is subtracted from the command roll angle at a subtractor 18, to generate a roll angle error signal. The roll angle error is passed through a conventional proportional plus integral (P+I) controller 20 to generate a component of aileron command. The signal from the P+I controller 20 will move the ailerons as well as other roll control surfaces which may include spoilers, elevons, flaperons, or differential stabilators to drive the roll angle error to zero. A quickening path 16 is provided downstream of switch 15 via a washout filter 22 to generate another component of the aileron command; which in turn is summed with the command from the P+I controller 20 at a summer 21. In the present embodiment the washout filter 22 approximates a differentiator, and hence it tends to cancel the effect of the integrator 13. In this manner, the quickening path approximates a direct gain path from the pilot's roll controller to the ailerons.

Two more feedback paths contribute to the aileron command as shown in FIG. 1. A roll rate feedback signal from the aircraft inertial reference system is passed through a gain block 27 to generate another component of aileron command which provides roll damping. Furthermore, a yaw/roll crossfeed path 28 provides an additional component of the aileron command which typically will be used to decouple aircraft yaw/roll dynamic coupling in a conventional manner. This crossfeed may come from rudder pedal position, sideslip command, rudder command, engine-out compensation rudder command, and/or rudder position signals. These signals also may be passed through gains and filters to synthesize the yaw/roll crossfeed. The roll damping and yaw/roll crossfeeds are added to the previously described components from summer 21 at a downstream summer 29. The roll damping signal will be subtracted at summer 29, however, if the gain block 27 is positive.

The final aileron command output from summer 29 is transmitted to aileron actuators (not shown) at the aircraft left and right aileron surfaces. Sign convention in FIG. 1 assumes that the left aileron trailing edge down is positive. The aileron command also will be passed through a conventional spoiler mixer 30 to generate spoiler commands. The spoiler mixer incorporates conventional schedules for each spoiler panel as functions of aileron command and speedbrake command.

In order to engage the track angle hold subsystem of the present embodiment (switch 15 in the down position), at least two conditions must be met simultaneously. These conditions are (1) that the pilot roll controllers be in their centered detents, and (2) that the roll command be within a plus-or-minus 2.5 degree threshold of an estimated roll angle required to maintain the airplane track. This estimated roll angle required to maintain track angle is hereinafter referred to as the "required roll angle bias". Condition (1) typically will be satisfied when the output of deadzone 11 (FIG. 1) is zero, or equivalently, when the roll rate command is zero. Regarding condition (2), the required roll angle bias typically will be zero for a symmetrical aircraft condition (e.g., one with zero sideslip and no noncenterline engine failure). For a symmetrical flight condition, condition (2) alternatively can be stated as requiring the magnitude of the preliminary roll command be less than or equal to 2.5 degrees, or within 2.5 degrees of a wings level condition. Computation of the required roll angle bias for asymmetric flight conditions (e.g., sideslipping flight or flight following a noncenterline engine failure), and operation of track angle hold for such asymmetric flight conditions, are described in detail in Applicants' copending application entitled "Apparatus and Methods for Maintaining Aircraft Track During an Asymetric Flight Condition", filed the same date as the present application, and incorporated herein by reference in its entirety.

The above description applies to the engagement of the in-air track angle hold function from a disengaged condition. Transition from an engaged condition to a disengaged condition simply requires the pilot to move his roll controller out of its centered detent, and therefore it does not depend upon the magnitude of the preliminary roll command or the final roll command. The engaged or disengaged condition of the in-air track angle hold function may be displayed to the pilot on his primary flight display.

As stated previously, when track angle hold is engaged, switch 15 (FIG. 1) is moved to the down position. This allows the track angle hold function to automatically control the airplane so that its actual track angle closely approximates the command track angle. This is accomplished by means of signals from a path generally indicated at 44. To begin with, a track angle feedback signal from the aircraft inertial reference system (not shown) is fed through a filter 48. The filtered track angle is subtracted from a track angle command (to be described shortly) at a subtractor 50 to generate a track angle error. The track angle error is passed through a conventional proportional plus integral controller 55 and a conventional gain 56 to generate a roll angle command needed to drive the track angle error to zero. When track angle hold is first engaged, the integrator portion of the controller 55 is initialized in a conventional manner as required in order to ensure continuity of the roll command when switch 15 is moved to the down position. It should be noted that it is a conventional practice to initialize an integrator upstream of a switch in order to ensure continuity of a parameter proceeding downstream of the switch.

In addition, a track angle command is generated at a block 59 using either an actual track angle existing at the time of engagement or a predicted track angle. A predicted track angle can be estimated by multiplying the actual track rate by a time constant and adding the resulting product to the actual track angle, or by passing actual track angle through an appropriate lead-lag filter such as filter 48 in FIG. 1. Use of a predicted track angle provides some anticipation to the capture of a desired track angle. This allows the pilot to select the commanded track angle and center the control wheel prior to the aircraft actually reaching the commanded track angle. The system then smoothly and automatically captures the desired track angle command. Typical anticipation time constants for predicted track angle are between one and five seconds.

In one embodiment the filter 48 is a lead-lag filter which outputs predicted track angle. The track angle command is initialized to this predicted track angle at the time of track angle hold engagement. The track angle command and predicted track angle may be displayed along with actual track angle on the pilot's horizontal situation indicator or other similar display, to aid the pilot in precisely capturing the desired track angle.

While track angle hold is engaged, a pilot vernier track controller 57 (FIG. 1) may be utilized to permit the pilot to "fine tune" the track angle command. For example, the pilot may wish to fine tune the track angle command to align the aircraft with a localizer approach track. The controller 57 may be a laterally movable thumb operable switch (thumbswitch) located on the pilot's roll controller. A bidirectional thumbswitch also may be provided to allow the pilot to make vernier inputs to both track angle (lateral) and flight path angle (longitudinal). When track angle hold is disengaged, switch 15 moves to the up position and the integrator at block 13 is initialized to ensure continuity of the roll command signal downstream of switch 15.

The above discussion relates to the operation of the track angle hold function while the aircraft is in flight. However, when the aircraft first becomes airborne after takeoff, the integrator in block 20 is initialized to ensure continuity of the aileron command. If the switch 15 (FIG. 1) is in the up position (track angle hold not engaged), the integrator at block 13 is initialized to a predicted, actual, or filtered roll angle in the manner described previously. On the other hand, if switch 15 is in the down position (track angle hold engaged), the integrator at block 55 is initialized to a value equal to the predicted, actual, or filtered roll angle, divided by the gain at block 56.

If an on-ground lateral control system is using a roll command at the time of takeoff (i.e., roll angle command on ground), the integrators at blocks 13 or 55 preferably are initialized in order to ensure continuity of roll command throughout the takeoff maneuver. In an alternate embodiment to be described later, there is provided an on-ground directional control system. If on-ground track angle hold is engaged at takeoff, the track angle command at block 59 preferably will be initialized to the last track angle command generated from the on-ground directional control system. If on-ground heading angle hold is engaged at takeoff, the track angle command preferably will be initialized to a predicted, actual or filtered track angle existing at the time of takeoff.

Figure 2:
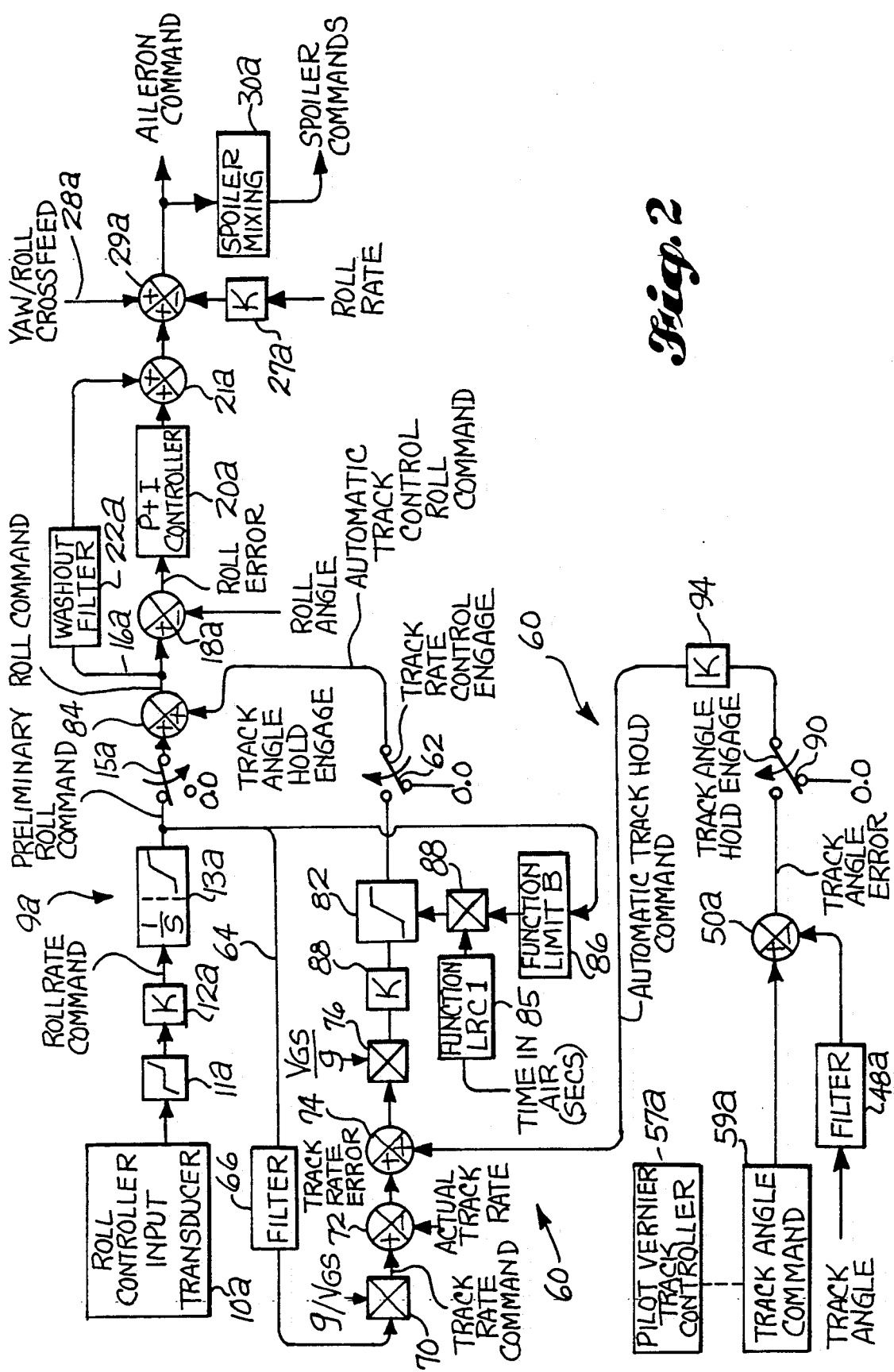
FIG. 2 is a block diagram of a modified version of the in-flight track angle hold control subsystem shown in FIG. 1 and featuring a transition from roll angle to track rate control for smaller roll angles.

Referring now to FIG. 2 there is shown a control system which transitions from a roll angle control function to a track rate control function at progressively smaller aircraft roll angles. The term "track rate" is defined as the time derivative of track angle. Like elements described in the previous embodiment have been assigned like numerals with the suffix "a" attached. In the present embodiment, the track rate control elements are generally indicated by the number 60. When track angle hold is disengaged (switch 15a up) and track rate control is disengaged (switch 62 down), it is evident that only the direct roll rate control path 9a is operational. The logic for track angle hold engagement and disengagement is the same as that described with reference to FIG. 1. In the present embodiment, track rate control is engaged when the magnitude of the difference between the roll angle command and the estimated roll angle required to maintain the airplane track angle (i.e., required roll angle bias) is less than a selected threshold value (e.g., 6 degrees). This threshold value is larger than the threshold value (2.5 degrees) used in the track angle hold engage logic discussed previously with regard to FIG. 1. As mentioned before, the required roll angle bias typically is zero for a symmetrical aircraft condition (e.g., one with zero sideslip and no noncenterline engine failure). During a symmetrical flight condition, track rate hold is engaged when the magnitude of the roll command is within six degrees of a wings level condition. Computation of required roll angle bias for asymmetric flight conditions (e.g., sideslipping flight or flight following a noncenterline engine failure), and operation of track rate control in conjunction with track angle hold for such asymmetric flight conditions, are described in detail in Applicants' copending application 07/231,208 entitled "Apparatus and Methods for Maintaining Aircraft Track During an Asymmetric Flight Condition", now U.S. Pat. No. 4,935,682.

The primary purpose of the track rate control subsystem is to provide for smooth transitioning between conventional roll rate control (previouslY described with reference to numeral 9 in FIG. 1) and track angle hold. As the pilot rolls the airplane from a banked turn towards wings level, system control transitions progressively from roll rate control through track rate control to track angle hold (this transition takes place as roll command decreases from 6 degrees to 2.5 degrees in the preferred embodiment shown). During a gradual rollout from a steady coordinated turn in zero wind, there is no difference between roll angle control and track rate control. This is because roll angle and track rate are related to each other by the ratio of aircraft groundspeed over aircraft gravitational acceleration. Therefore, this control system performs in a substantially identical manner as the control system described with reference to FIG. 1 under these "ideal" circumstances. However, during (i) a rapid rollout and/or (ii) a noncoordinated turn and/or (iii) varying wind conditions, track rate dynamics can deviate substantially from the roll angle dynamics. Under these circumstances and using the track angle control system described with reference to FIG. 1, the track rate can be significantly different from zero at the time track angle hold is engaged. This can result in significant track angle dynamics (e.g., overshoot) after track angle hold engagement. The purpose of the system described with reference to FIG. 2 is to initiate control system response to track rate signals instead of roll angle signals before track angle hold engagement, and thereby reduce undesirable track angle dynamics after track angle hold engagement.

Track rate control is engaged when switch 62 (FIG. 2) flips up (magnitude of difference between roll angle command and roll angle bias less than six degrees). A track rate command is synthesized (i) by passing the preliminary roll command along a path 64 through a filter block 66, which may also include a gain modification stage, and (ii) by multiplying the resultant signal at a multiplier 70 by a ratio ($g/V_{gs}$) of the gravitational acceleration of the aircraft over the aircraft groundspeed (obtained from the aircraft's inertial reference system). The theoretical basis for this formulation lies in the fact that the track rate for an ideal coordinated turn in a no wind condition is equal to the product of the roll angle and gravitational acceleration divided by the aircraft groundspeed.

A signal representative of the actual track rate of the aircraft is subtracted from the track rate command signal at a subtractor 72. The actual track rate signal may be obtained from a conventional sensor or it may be a synthesized signal (e.g., track angle signal fed through a differentiator or a washout filter). The resulting track rate error signal output from subtractor 72 is passed through a summer 74 and then on to a multiplier 76 where it is multiplied by a ratio of the aircraft groundspeed over the gravitational acceleration of the aircraft. In this embodiment, the role of multiplier 76 is to cancel out the effect of multiplier 70. The control signal output from multiplier 76 is passed through an empirical gain factor block 80 to produce an estimated roll command modification signal needed to zero the track rate error signal. This estimated roll command modification signal is passed through a limiter 82 to produce an automatic track control roll command (i.e., a roll angle command due to automatic track rate hold), which in turn is fed via switch 62 to a summer 84 which is located downstream of the switch 15a and upstream of the path 16a.

The limit values set by limiter 82 are obtained by multiplying the outputs of a function block 85 (LRC1) and function block 86 (LIMIT B) at a multiplier 88. The purpose of function LRC1 is to provide a gradual increase in the roll control authority given to the track rate hold function during the first several seconds of flight after takeoff. The input to block 85 is provided by a timer onboard the aircraft. This ensures a smooth and transient-free engagement of the automatic track rate hold control law as the airplane takes off in a crosswind. The operation of function block 85 is set forth in further detail in the following table of representative values:

| INPUT (seconds) | OUTPUT |
| --- | --- |
| 0.0 | 0.1 |
| 2.8 | 0.0 |
| 4.0 | 0.125 |
| 7.0 or greater | 1.0 |

Note: Use linear interpolation between data points.

On the other hand, the purpose of function LIMIT B is to provide a smooth and gradual increase in roll control authority of the track rate/angle hold functions as the preliminary roll angle command from the pilot decreases from six degrees towards zero degrees (e.g., as the pilot rolls the airplane towards wings level). The input to block 86 is provided from the output of block 13a. The operation of function LIMIT B block 86 is set forth in further detail in the following table of representative values:

| INPUT (degrees) | OUTPUT |
| --- | --- |
| less than or equal to −6.0 | 0.0 |
| −3.0 | 2.0 |
| −2.0 | 3.0 |
| −1.0 | 5.0 |
| 0.0 | 6.0 |
| 1.0 | 5.0 |
| 2.0 | 3.0 |
| 3.0 | 2.0 |
| greater than or equal to 6.0 | 0.0 |

Note: Use linear interpolation between data points.

In the present embodiment, the track angle hold command is generated in the following manner when the track angle hold is engaged. A signal representing the actual track angle of the aircraft is passed through filter 48a and is subtracted at subtractor 50a from the track angle command. The filter 48a may, for example, be a lead-lag filter to provide anticipation and smoothing to a track angle signal obtained from the aircraft's inertial reference system. The track angle command signal is initialized in the manner discussed previously so as to provide continuity of the roll command signal when track angle hold is first engaged.

The output of subtractor 50a is a track angle error signal which is passed through a switch 90 and then downstream through an empirical gain modification block 94 to generate the track angle hold command. The resulting track angle hold command is summed with the track rate error at summer 74.

Track rate control is engaged when the magnitude of the difference between the roll angle command and the estimated roll angle required to maintain the airplane track angle is less than six degrees. Track angle hold is not engaged when the magnitude of the difference between the roll angle command and the estimated roll angle required to maintain the airplane track angle is greater than 2.5 degrees or the pilots roll controller is not in its centered detent. When track rate control is engaged (switch 62 up) but track angle hold is not engaged (switch 15a up and switch 90 down), the automatic track control roll command is driven solely by the track rate error function. This automatic track control roll command is an incremental command which is added to the preliminary roll command from the pilot at summer 84.

Track angle hold engages when the magnitude of the difference between the roll angle command and the estimated roll angle required to maintain the airplane track angle is less than 2.5 degrees and the pilot's roll controller is placed in its centered detent. At this time switch 15a flips down and switch 90 flips up. Since positioning of switch 15a in the down position effectively disconnects the pilot's preliminary roll command from feeding into summer 16a, the automatic track control roll command is now an absolute rather than an incremental command. This roll command is now driven by both the track rate error and track angle error terms summing at summer 74. In this manner, both the automatic track rate hold and the automatic track angle hold functions are engaged at the same time.

At the time of track angle hold engagement, the magnitude of the pilot's preliminary roll command must be less than or equal to 2.5 degrees. Following track angle hold engagement, the integrator 13a (which holds the preliminary roll command) ramps down to zero. This ensures that the steady state track rate command will be zero while track angle hold is engaged. The track rate feedback into summer 72 still may move around zero as the airplane responds to lateral gusts. The use of track rate feedback while in track angle hold provides some desirable damping to track angle dynamics in response to wind gusts.

When the pilot moves his roll controller, the track angle hold function is disengaged when switch 15a flips up and switch 90 flips down. At this time, integrator 13a is initialized in a conventional manner to ensure continuity of the roll command output from summer 84.

Figure 3:
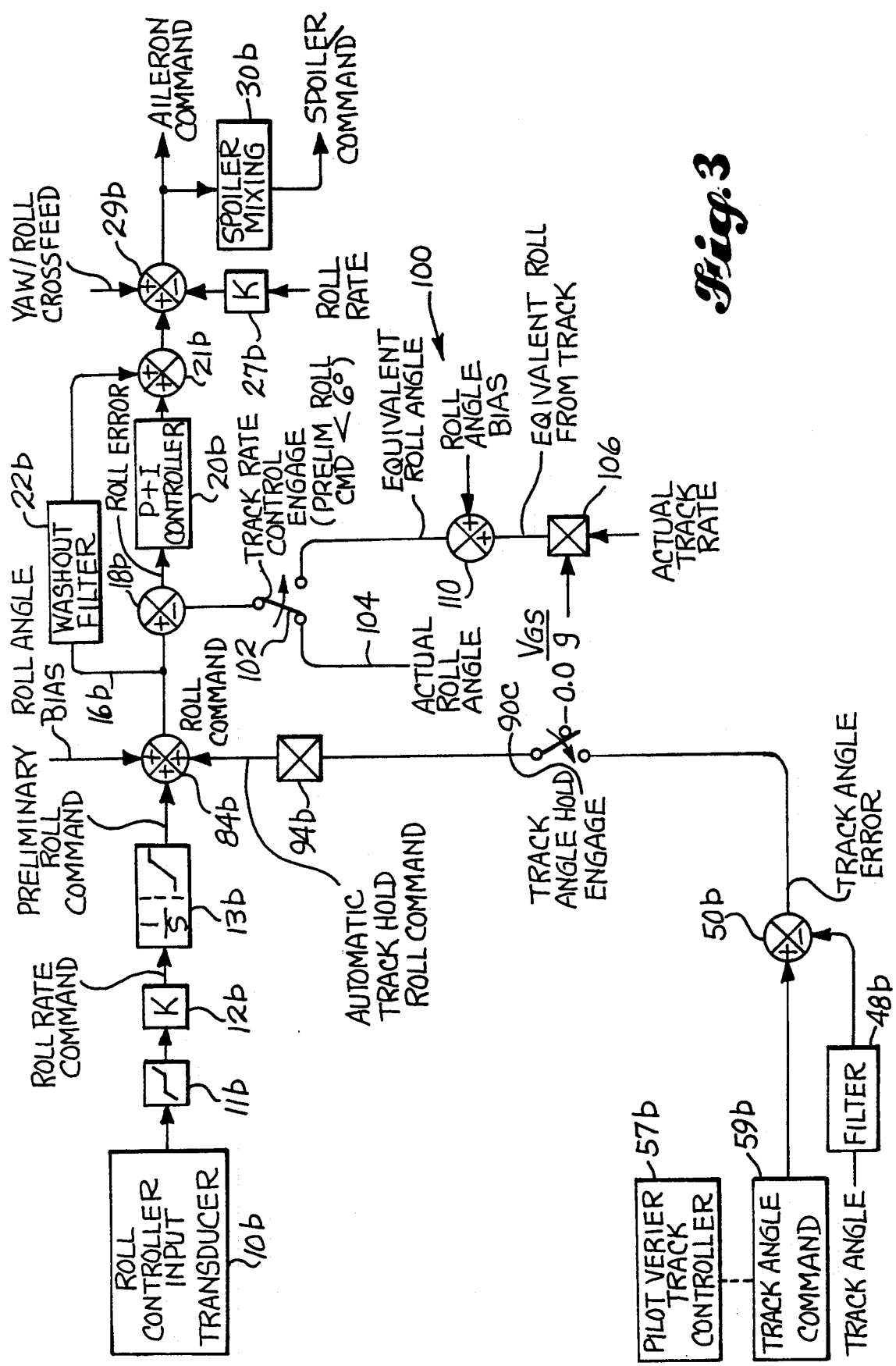
FIGS. 3 and 4 are block diagrams of additional modified versions of the in-flight track angle hold control system shown in FIG. 1, and which use an inner loop modification rather than an outer loop modification to achieve track rate control.

Reference is now made to FIG. 3 which shows an alternate embodiment of the present invention wherein a track rate control subsystem uses an inner loop modification to achieve automatic track rate control. In the present embodiment, like elements described in previous embodiments are designated by like numerals with the suffix "b" attached. The inner loop modification generally indicated at 100 includes a switch 102 in a roll angle feedback path 104. When track rate control is disengaged, switch 102 is in the left position and actual roll angle is fed to the subtractor 18b. However, when the magnitude of the preliminary roll command decreases below some threshold value (e.g., 6 degrees), the track rate control function is engaged and switch 102 flips to the right. The roll angle feedback is now replaced by an "equivalent" roll angle synthesized from the aircraft's actual track rate. This provides track rate control in place of roll angle control.

The actual track rate signal may be obtained from a conventional sensor or it may be a synthesized signal (e.g., track angle signal fed through a differentiator or a washout filter). The equivalent roll angle is synthesized by (i) passing the actual track rate feedback signal system through a multiplier 106 where it is multiplied by the ratio of aircraft groundspeed over gravitational acceleration to generate an equivalent roll-from-track rate signal, and (ii) adding a roll angle bias to the equivalent roll-from-track signal at a downstream summer 110. The roll angle bias input to summer 110 is generated during asymmetric flight conditions and is discussed in further detail in Applicants' copending patent application entitled "Apparatus and Methods for Maintaining Aircraft Track During an Asymmetric Flight Condition". The purpose of summing roll angle bias with equivalent roll-from-track is to make the equivalent roll angle truly equivalent to the actual roll angle (i.e., "roll angle" includes the effect of roll angle due to track rate for a coordinated turn plus a bias term for noncoordinated turns/asymmetric effects). In the present embodiment the roll angle bias is added in at summer 18b to bias the roll command.

Figure 5:
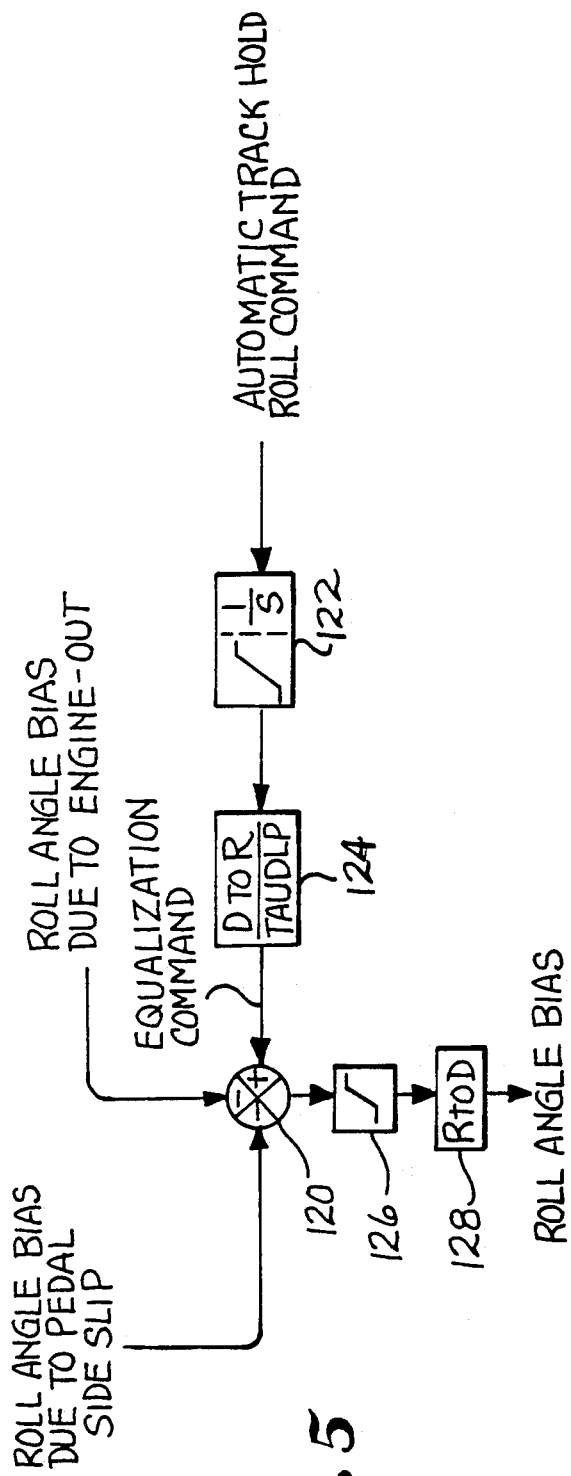
FIG. 5 is a block diagram showing the generation of a roll angle bias signal used in the control systems shown in FIGS. 3 and 4.

The generation of the roll angle bias is described with reference to the diagram in FIG. 5. The inputs "roll angle bias due to pedal sideslip" and "roll angle bias due to engine-out" are discussed in Applicants' copending application entitled "Apparatus and Methods for Maintaining Aircraft Track in an Assymetric Flight Condition". These inputs are subtracted at a subtractor 120 from an equalization command. The equalization command is obtained in a conventional manner by passing the automatic roll command discussed previously through a limited integrator 122 and a gain conversion block 124. The output from subtractor 120 is fed through a limiter 126 and a radians-to-degrees conversion block 128 to generate the roll angle bias. When track angle hold is disengaged, integrator 122 is caused to ramp to zero.

In this manner, the feedback signal to switch 102 (FIG. 3) will change from roll angle to track rate as the pilot commanded preliminary roll command decreases below six degrees. This accomplishes substantially the same functional effect as the addition of the track rate control roll command described previously with reference to numeral 60 in FIG. 2.

Track angle hold engage logic for this embodiment is the same as that described with reference to FIG. 2. When track angle hold is disengaged, switch 90b (FIG. 3) is moved to the right position. When track angle hold is engaged, switch 90b is moved to the left position, and an automatic roll command is generated by passing the track error through the gain stage 94b in a conventional manner. As described in previous embodiments, the track angle command at block 59b is initialized so as to provide continuity of roll command at the time of track angle hold engage, and integrator 13b is initialized to provide continuity of roll command at the time of track angle hold disengage.

When track angle hold is disengaged (switch 90b to right) and when track rate control is engaged or disengaged (i.e., switch 102 flips right or left), the potential for a transient arises due to the switching between roll angle and equivalent roll angle feedback at switch 102. At the time of switching a step transient may be produced at the output of switch 102 (FIG. 3), which in turn may be fed into the roll error feeding into the P+I controller 20b. The integral path in the P+I controller 20 will automatically smooth out the step transient, but the proportional path may transmit the step transient to the aileron command. To prevent this, special smoothing provisions are built into the proportional path of the P+I controller. For example, when a step transient is generated by movement of switch 102, an equal and opposite step may be added to the proportional path of the P+I controller 20 to cancel the step transient. Then the cancelling step can be ramped or washed out to zero over some time interval so as to leave no residual bias or error in the steady state proportional path command.

Figure 4:
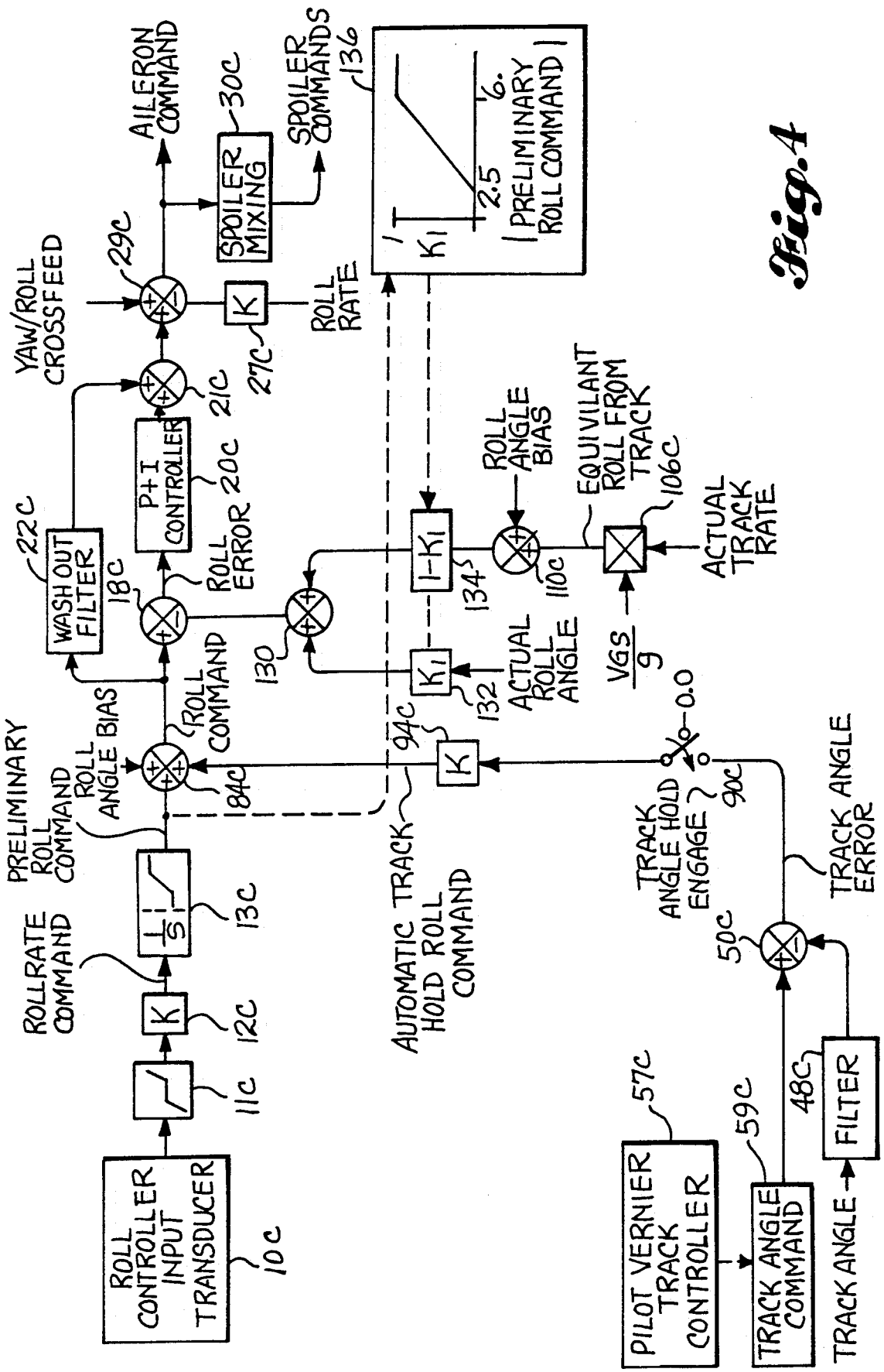

In another exemplary embodiment, reference is made to FIG. 4 where like elements described in previous embodiments are identified by like numerals with the suffix "c" attached. In this embodiment, step transients are prevented by replacing switch 102 with a summer 130. Therefore, no special provisions are needed to cancel transients in the proportional path of the P+I controller 20c. Rather, the feedback to subtractor 18c is a blend (or linear combination) of roll angle and track rate feedbacks. The inputs to summer 130 include actual roll angle which is fed through a gain $K_1$ at a gain block 132, and an equivalent-roll-from-track fed through a gain $(1-K_1)$ at a gain block 134. The gain $K_1$, which is defined by the schedule in block 136, ramps between zero and one as the magnitude of preliminary roll command increases from 2.5 degrees to 6 degrees (the transition zone between track angle hold engage and track rate hold engage). Track rate control engage logic is essentially imbedded in the gain schedule at block 136. The effect of ramping gain $K_1$ is to transition the feedback smoothly from roll angle feedback to equivalent-roll-from-track feedback.

Having completed a description of the in-air track angle hold and track rate control modes of the present invention, attention now will be turned to the on-ground modes of operation. In the embodiment shown in FIG. 6, a directional control subsystem replaces conventional direct cable links between the pilot's rudder pedals and the airplane rudder and nosewheel steering. The pilot's rudder pedal input is measured at a rudder pedal position sensor (or transducer) 210. Rudder pedal input is defined as positive for left pedal in (i.e., force applied to left pedal). The output of the rudder pedal position sensor 210 is passed through a neutral position deadzone 212, and then through a negative gain $(-K)$ stage at a block 214 to define a track rate command in a conventional manner. In this manner a pilot pedal input is interpreted as a track rate maneuver command, with a left pedal input (positive) commanding a nose left track rate (negative). The track rate command is integrated at an integrator 218 to generate a track angle command. A feedback signal of actual track angle is subtracted from the track angle command at a subtractor 220 to generate a track angle error signal. Track angle can be defined over a range of plus or minus 180 degrees or a range of 0 to 360 degrees. In either case, provision is made to simultaneously transition track angle command and track angle when turning through 180 degrees or 360 degrees to ensure continuity of the track error signal. The track angle error is passed through a conventional proportional plus integral (P+I) controller 222 which outputs a component of rudder command which will tend to reduce the track angle error to zero.

The P+I controller 222 preferably will limit the integrator and the proportional paths to prevent these paths from commanding more than an achievable amount of rudder command (after accounting for the other command paths feeding the rudder comand). A summer 224 sums the P+I controller component of rudder command (a minus sign because positive track error requires a corrective negative rudder command) with a pilot direct path rudder command from a path 226 and a yaw damping rudder command from a path 228. The pilot direct path rudder command is generated from the output of deadzone 212 which is passed through a gain block 230 and summed positively at summer 224. The pilot direct path rudder command preferably will incorporate limits (not shown) which prevent this path from commanding more than achievable rudder commands.

The yaw damping rudder command is obtained in a conventional manner by multiplying a yaw rate feedback (positive nose right) by a gain block 232. In an alternative embodiment (not shown), track rate damping can be provided, in lieu of, or in addition to yaw rate damping, by replacing the yaw rate feedback with a track rate feedback or a blend of yaw rate and track rate.

The composite rudder command from summer 224 is passed on to a summer 233 where an engine-out control augmentation (ECA) rudder command (positive rudder trailing edge left) is added to it. The purpose of the ECA rudder command is to effectively reduce the yawing moment acting on the aircraft immediately following failure of a noncenterline engine, particularly during the takeoff roll. The generation of the ECA rudder command is more fully described in patent application Ser. No. 07/231,208 to M. S. McCuen, entitled "Full Authority Engine-Out Control Augmentation Subsystem", filed Aug. 11, 1988 now U.S. Pat. No. 4,935,682; the contents of which are incorporated herein by reference in their entirety. The ECA rudder command is shown feeding into both rudder and nosewheel steering commands.

In an alternative embodiment the ECA rudder command sums with the rudder command downstream of the branch to nosewheel steering and thereby affects only the rudder and not the nosewheel. The ECA rudder command preferably will be inhibited (i.e., disabled) when the aircraft is below a certain threshold groundspeed (e.g., 60 knots).

The output of summer 233 is passed through a gain block 234 to generate a rudder command. Gain values in blocks 234, 232, 230, and/or 214 may be scheduled as a function of aircraft groundspeed and/or some air data variable (e.g., airspeed or impact pressure) to provide a "ratio changing" function similar to the function performed by current aircraft mechanical ratio changers in the yaw control path. Scheduled limit values (not shown) also may be combined with these gains. Gain and limit values associated with the aforementioned blocks also may be varied by timers which start at landing touchdown or at other critical times, to improve dynamic response of track angle in the first few seconds after touchdown.

The rudder command is sent to rudder actuators as well as to a nosewheel mixing block 236 to generate a nosewheel steering command. The nosewheel mixing provides a larger amount of nosewheel steering relative to the rudder at low groundspeeds, and smaller amounts of nosewheel steering relative to the rudder at higher groundspeeds. Gains and limits in the nosewheel mixing module may also be scheduled as a function of aircraft groundspeed and/or air data variables (e.g., airspeed, impact pressure). The nosewheel steering command is transmitted to at least one nosewheel steering actuator to steer the nosewheel(s) of the aircraft.

When the aircraft first contacts the ground in a landing maneuver, the track angle command at integrator 218 (FIG. 6) is initialized to actual, filtered, or predicted track angle. A sensor signal representative of actual track angle is available from the aircraft's inertial reference system (not shown). The filtered track angle may be, for example, the track angle signal passed through a lag filter. The predicted track angle may be, for example, the track angle signal passed through a lead-lag filter. The filtered or predicted track angles also can be used as feedback variables, in lieu of track angle, to summer 220. In addition, at landing touchdown the integrator in the P+I controller 222 is initialized in a conventional manner as required to ensure a smooth and transient-free rudder command. While in the on-ground track angle control mode, track angle command may be displayed to the pilot (e.g., on his horizontal situation indicator) in addition to actual or filtered track angle. The predicted track angle also may be displayed.

Figure 6:
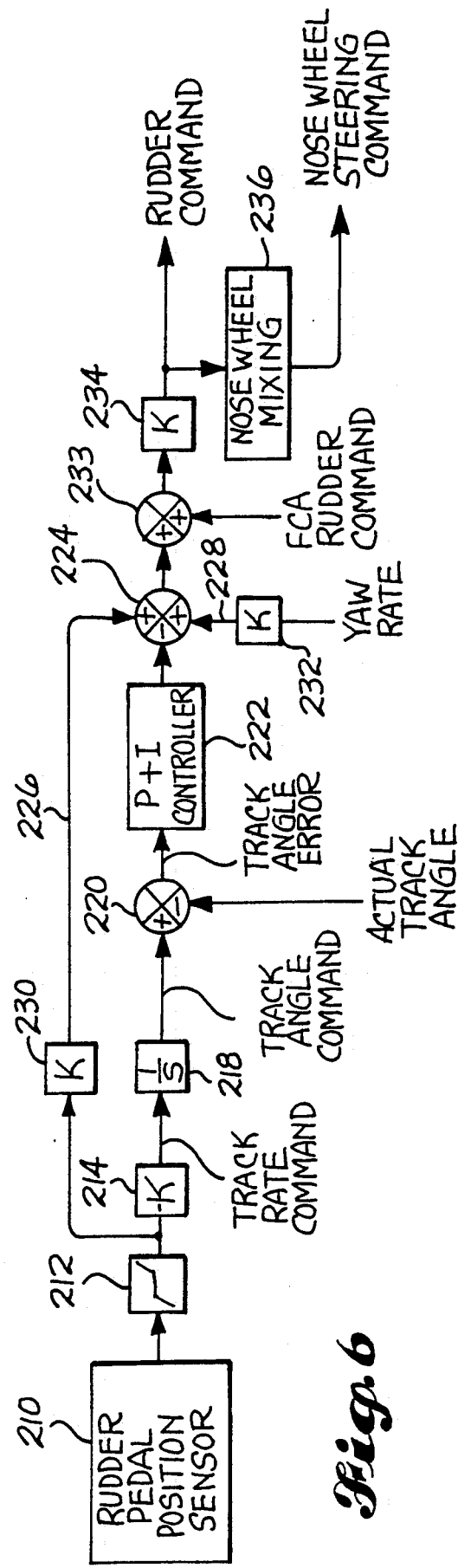
FIG. 6 is a block diagram of an exemplary on-ground track rate command directional control system for an aircraft.

In an alternate embodiment of the present invention described with reference to FIG. 7, like elements described with reference to previous embodiments are designated by like numerals with the suffix "d" attached. In this embodiment, track angle control described with reference to FIG. 6 is replaced by heading angle control. The distinction between track angle and heading angle is as follows: track angle is the direction the aircraft's velocity vector points measured clockwise relative to north (true or magnetic), and heading angle is the direction the aircraft's centerline (i.e., along plane of symmetry) points measured clockwise relative to north (true or magnetic).

This embodiment is identical to the embodiment described with reference to FIG. 6 except that (i) the output from gain block 240 is defined as a heading rate command instead of a track rate command, (ii) the integrator at block 242 generates a heading angle command instead of track angle command, and (iii) the summer $220d$ uses heading angle feedback from the inertial reference system instead of track angle feedback to generate a heading error instead of a track error. In this embodiment, filtered heading angle or predicted heading angle can be substituted for heading angle in alternate embodiments. In a preferred embodiment, the gain at block 240 is the same gain 214 used in the FIG. 6 embodiment to define the track rate command.

Since the pilot's primary directional control task for takeoff and landing is to maintain the aircraft track along (or close to) the runway centerline, a track angle control law is preferable to a heading angle control law for reducing pilot directional control workload. This is particularly true during crosswind, gust, or engine-failure conditions on a slippery (e.g., icy) runway.

Unfortunately, the track angle sensor signals generated from state-of-the-art inertial reference systems are subject to significant Schuler error effects when the aircraft is accelerating or decelerating on the runway. The track angle is computed as $\tan^{-1}(V_{east}/V_{north})$. The Schuler error takes the form of very slowly varying sinusoidal errors in $V_{east}$ and $V_{north}$, with unrelated magnitudes and phases for the $V_{east}$ and $V_{north}$ errors. The worst case error for track angle control occurs when the cross-runway Schuler error is large. For example, if the $V_{east}$ Schuler error is large at the time of takeoff/landing, for an aircraft taking off or landing on a north-south runway, the computed track angle effectively will "swing" as a function of $\tan^{-1}(V_{east}/V_{north})$ as the aircraft accelerates or decelerates. The erroneous swing in computed track angle may amount to several degrees over the duration of a takeoff or landing, and may be sufficient to cause the aircraft to swing off the runway instead of holding a true track along the runway centerline.

A heading angle output from a state-of-the-art inertial reference system is not subject to Schuler errors, and hence is a much more precise feedback variable for on-ground directional control. While pilot workload for heading angle control may be somewhat higher than for track angle control during adverse conditions, still it is expected to be substantially lower than for conventional direct pedal-to-rudder/nosewheel steering control.

When using the on-ground heading angle control law, the heading angle command may be displayed to the pilot (e.g., on his HSI) in addition to heading angle. A predicted heading may also be displayed.

A significant problem associated with heading angle control is the initialization of the heading angle command when the aircraft first contacts the ground upon landing with a significant crab angle during crosswind conditions. Crab angle is the angle between the track angle and heading angle. An aircraft landing in a crosswind either must land with a nonzero crab angle (landing in a crab) or a nonzero roll angle (landing with decrab). When the aircraft lands in a crab, initially it is not pointed in the same direction as the runway centerline (i.e., aircraft heading angle is not aligned with the runway heading). For a dry runway landing, the aircraft heading must be quickly aligned with the runway immediately after touchdown so that the aircraft can track along the runway centerline. On the other hand for an icy runway landing, the aircraft heading should remain displaced relative to the runway heading for the aircraft to track along the runway centerline. Thus, it is desirable to initialize the heading angle command to a value which is close to that of runway heading for a crabbed crosswind landing on a dry runway. It also is desirable to initialize the heading angle command to a value which is close to the last in-air aircraft heading prior to landing when performing a crabbed crosswind landing on an icy runway. Unfortunately, there is no practical way for the control system to determine beforehand whether the runway is dry or icy. This exposes a fundamental problem as how to intialize heading angle command for landing.

In another embodiment of the present invention described with reference to FIG. 8, like elements described in previous embodiments are designated by like numerals with the suffix "e" attached. In this embodiment, heading angle command initialization is accomplished for crosswind landings in a crab. This is accomplished by using the on-ground track angle control law for the first few seconds after landing, and then switching to the on-ground heading angle control law for the remainder of the landing rollout. In the present embodiment, the output of gain block 250 is a defined track/heading (T/H) rate command. It is reasonable to use the same gain to define track and heading rate commands from the rudder pedal position sensor because track rate and heading rate are almost equal in magnitude for nominal dry runway conditions. For icy runway conditions, the pilot will be trained with regard to differences between track and heading responses. Furthermore, the output of integrator 252 is a track/heading (T/H) angle command, and summer 220e subtracts either track angle feedback or heading angle feedback signals from the T/H angle command to generate a T/H error.

In the present embodiment, the logic signal 'Heading Control Engage' is false when the aircraft first contacts the ground upon landing so that switch 258 is initially in the right position. The track angle command at integrator 252 is initialized to the last in-air value of a signal derived from the track angle (e.g., actual, filtered, or predicted track angle). Alternatively the track angle command can be initialized to the last in-air value of track angle command described with reference to FIGS. 1 through 4, provided that the in-air track angle hold engage signal was true at the time of landing touchdown. Either of these alternative initialization methods will result in a "correct" initialization for most plausible landing scenarios, including crabbed crosswind landings on dry or icy runways. Thus, by using track angle control for the first few seconds after landing, the problems associated with heading angle command initialization can be avoided. The use of track angle feedback does, of course, result in the introduction of some Schuler errors. However, limiting the use of track angle control to only a few seconds reduces the adverse impact of Schuler errors to within acceptable levels.

Just after landing in a crab on a dry runway, the track angle control law will swing the aircraft heading into alignment with the runway heading so as to maintain the aircraft track angle aligned with the runway centerline. Just after landing in a crab on an icy runway, the track angle control law will maintain the aircraft heading displaced relative to the runway heading to the extent required to maintain the aircraft track angle aligned with the runway centerline. In either case, when control transitions to heading angle control a few seconds after touchdown, the aircraft will follow the desired track along the runway centerline with an appropriate heading angle. At this time heading control engage becomes true, and switch 258 is moved to the left position. Then integrator 252 is re-initialized in a conventional manner as required to provide continuity of the T/H error output from summer 220e. Alternatively, integrator 252 can be initialized to a linear combination of track angle command, track angle, heading angle, track rate, and heading rate in such manner as to provide a smooth dynamic transition from track angle to heading angle control. The inner loop integrator in the P+I controller at block 222e may be re-initialized, if re-initialization is required, to provide continuity of rudder command at the time heading control engage becomes true. Following this, as the airplane decelerates, heading angle control is provided. During takeoff, heading angle control is provided up to the time of liftoff from the runway (i.e., switch 258 is in the left position).

In a further embodiment of the on-ground track/heading angle control laws, there is provided a switch 260 (FIG. 8) which is located between the P+I controller 222e and the summer 224e. The switch 260 disengages both the track and heading control laws at low speeds while the aircraft is on the ground. This is a desirable feature due to the fact that directional control at low speeds (e.g., for taxiing) easily can be accomplished by conventional direct rudder pedal-to-rudder and nosewheel steering command links. Reverting to direct pedal-to-rudder and nosewheel control at low speeds has the advantage of providing the pilot with a familiar directional control task.

In a preferred embodiment, track/heading (T/H) disengage becomes true and switch 260 (FIG. 8) moves to the up position when the aircraft decelerates below a predetermined threshold groundspeed (e.g., between 30 and 60 knots). Switch 260 may be an "easy-off" type of switch to ramp the residual command output to zero from the P+I controller 222e when the switch 260 flips up, thus preventing rudder and nosewheel transients. During the takeoff roll, switch 260 flips down as the aircraft accelerates through a threshold groundspeed (e.g., somewhere between 30 and 60 knots). At this time the T/H angle command at integrator 252 is initialized to a value of the actual, filtered, or predicted heading angle, and the integrator in the P+I controller 222e is initialized in a conventional manner as required to prevent any rudder command transients at the time of T/H engagement.

In the present embodiment, gain and limit values associated with blocks 234e, 233e, 226e, and 250 may be adjusted as a function of aircraft groundspeed or air data scheduling variables, and/or as a function of a time interval which starts at landing touchdown, heading control engage, T/H disengage, and/or T/H engage, to improve dynamic response of track angle in the first few seconds after these transitions.

What is claimed is:

1. A control system for an aircraft, the control system comprising:
   a. roll input means, (i) which are movable by a pilot of the aircraft, for generating a first command signal which is a function of an input made by the pilot to the roll input means so as to control a roll angle of the aircraft and (ii) which are movable in a manner that when the roll input means are in a neutral position there is no rolling moment applied to the aircraft in response to the first command signal;
   b. means for generating a second command signal, as a function of a selected navigation angle, for controlling a roll angle of the aircraft so as to maintain the selected navigation angle;
   c. aircraft rolling means for generating a rolling moment on the aircraft; and
   d. control means for causing the aircraft rolling means to respond to the first command signal from the roll input means, unless the roll input means is in the neutral position and the first command signal is within a calculated roll angle threshold value, in which case the aircraft rolling means is caused to respond to the second command signal so as to maintain the selected navigation angle.

2. The control system as set forth in claim 1 wherein the control means includes means for calculating the roll angle threshold value as a function of an estimated roll angle of the aircraft required to maintain the selected navigation angle.

3. The control system as set forth in claim 1 wherein the control means includes means for calculating the roll angle threshold value as a value which is a selected interval from the estimated roll angle of the aircraft required to maintain the selected navigation angle.

4. The control system as set forth in claim 2 wherein the estimated roll angel is zero degrees for symmetrical aircraft flight.

5. The control system as set forth in claim 1 wherein:
   a. the selected navigation angle is a track angle;
   b. the control system additionally includes means for determining an actual track angle of the aircraft and for generating a signal representative thereof;
   c. the second command signal generating means includes means for responding to the actual track angle signal and for generating the second command signal as a function of the actual track angle of the aircraft when the roll input means is placed in the neutral position.

6. The control system as set forth in claim 1 wherein:
   a. the selected navigation angle is a track angle;
   b. the control system additionally includes means for determining an actual track rate of the aircraft and for generating a signal representative thereof; and
   c. the second command signal generating means includes first means for generating the second signal as a function of a predicted track angle of the aircraft in a manner that the first means includes (1) means for multiplying the actual track rate signal by a time constant to generate a product signal, and (2) means for combining the actual track angle signal and the product signal to generate the predicted track angle signal.

7. The control system as set forth in claim 1 comprising:
   a. means for generating a signal which is a function of an aircraft track rate;
   b. means for generating the second command signal as a function of the aircraft track rate when the roll angle signal is within a first roll angle threshold; and
   c. means for generating the second command signal as a function of the selected navigational angle and the aircraft track rate when the roll angle signal is within a second roll angle threshold value which is different from the first roll angle threshold value.

8. The control system as set forth in claim 7 wherein the control means includes means for calculating the first roll angle threshold value and the second roll angle threshold value as functions of an estimated roll angle of the aircraft required to maintain the selected navigation angle.

9. The control system as set forth in claim 7 wherein the control means includes
   a. means for calculating the first roll angle threshold value as a value which is a first interval from the estimated roll angle of the aircraft required to maintain the selected navigation angle; and
   b. means for calculating the second roll angle threshold value as a value which is a second interval from the estimated roll angle of the aircraft required to maintain the selectee navigation angle such that the second interval is less than the first interval.

10. The control system as set forth in claim 7 wherein the track rate signal generating means includes
    a. means for generating a track rate command signal as a function of the first command signal;
    b. means for determining an actual track rate of the aircraft and for generating a signal thereof; and
    c. means for generating a track rate error signal as a function of the track rate command signal and the actual track rate signal, for use as the track rate signal.

11. A control system for an aircraft, the control system comprising:
    a. direction input means which are movable by the pilot of the aircraft for generating a first command signal which is a function of an input made by the pilot to the direction input means for controlling a direction of travel of the aircraft on the ground and which are movable in a manner that when the direction input means is in a neutral position there is no change of directional input applied to the aircraft in response to the first command signal;
    b. means for generating a second command signal as a function of a selected navigation angle;
    c. aircraft direction means for controlling the direction of travel of the aircraft on the ground; and
    d. control means for causing the aircraft direction means to respond to the first command signal unless the direction input means is in the neutral position in which case the aircraft direction means is caused to respond to the second command signal so as to maintain the selected navigation angle.

12. The control system as set forth in claim 11 wherein the second command signal generating means includes means for generating the second command signal as a function of an actual track angle of the aircraft existing when the direction input means is placed in the neutral position.

13. The control system as set forth in claim 11 wherein:
   a. the aircraft direction means includes
      (1) nosewheel steering means,
      (2) means for controlling a position of the nosewheel steering means in response to a third signal which is a function of the first command signal,
      (3) rudder means, and
      (4) means for controlling a position of the rudder means in response to a fourth signal which is a function of the second command signal; and
   b. the control means includes means for adjusting the third signal and the fourth signal as a function of the speed of the aircraft on the ground so as to increase the amount of directional control provided by the nosewheel steering means relative to the rudder means as the speed of the aircraft decreases.

14. The control system as set forth in claim 11 wherein the navigational angle is a heading angle of the aircraft.

15. The control system as set forth in claim 11 wherein the control means includes (1) means for controlling the aircraft direction means so as to maintain the selected navigation angle as a track angle upon initial contact with the ground during landing, and (2) means for controlling the aircraft direction means so as to maintain the selected navigation angle as a heading angle during a remaining portion of the landing.

16. A control system for an aircraft, the control system comprising:
   a. roll input means, which are movable by a pilot of the aircraft, for generating a first roll angle command signal which is a function of an input made by the pilot to the roll input means so as to control a roll angle of the aircraft and which are movable in a manner that when the roll input means are in a neutral position there is no rolling moment applied to the aircraft in response to the first roll angle command signal;
   b. means for generating a second command signal, as a function of a selected in-flight navigation angle, for controlling a roll angle of the aircraft so as to maintain the selected in-flight navigation angle;
   c. aircraft rolling means for generating a rolling moment on the aircraft while the aircraft is in flight;
   d. control means for causing the aircraft rolling means to respond to the first roll angle command signal from the roll input means, unless the roll input means is in the neutral position, in which case the aircraft rolling means is caused to respond to the second roll angle command signal so as to maintain the selected in-flight navigation angle;
   e. direction input means which are movable by the pilot of the aircraft for generating a third direction command signal which is a function of an input made by the pilot to the direction input means for controlling a direction of travel of the aircraft on the ground and which are movable in a manner that when the direction input means is in a neutral position there is no change of directional input applied to the aircraft in response to the third directional command signal;
   f. means for generating a fourth direction command signal as a function of a selected on-ground navigation angle;
   g. aircraft direction means for controlling the direction of travel of the aircraft on the ground; and
   h. control means for causing the aircraft direction means to respond to the third directional command signal unless the direction input means is in the neutral position in which case the aircraft direction means is caused to respond to the fourth directional command signal.

17. The control system as set forth in claim 16 wherein:
   a. the selected navigation angle is a track angle;
   b. the fourth directional command signal generating means includes means for generating the fourth directional command signal as a function of an actual track angle of the aircraft existing when the direction input means is placed in the neutral position.

18. The control system as set forth in claim 17 wherein the control means includes means for initializing the value of the selected navigation angle on ground with the value of a navigation angle existing in flight when the aircraft transitions from an airborne mode to an on ground mode during landing so that during the transition the aircraft navigates the same navigation angle on the ground as maintained in flight prior to the transition.

19. The control system as set forth in claim 16 wherein the control means includes means for initializing the value of the selected in-flight navigation angle during flight with the value of the on-ground navigation angle when the aircraft transitions from the ground into flight during takeoff so that during the transition the aircraft navigates the same navigation angle in flight as navigated on the ground prior to the transition.

20. The control system as set forth in claim 16 wherein the control means includes means for initializing the value of the selected on-ground navigation angle with the value of the in-flight navigation angle when the aircraft transitions from an airborne mode to an on ground mode during landing so that during the transition the aircraft navigates the same navigational angle on the ground as navigated in flight prior to the transition.

21. The control system as set forth in claim 16 wherein:
   a. the aircraft direction means includes
      (1) nosewheel steering means,
      (2) means for controlling a position of the nosewheel steering means in response to a fifth signal which is a function of the fourth command signal,
      (3) rudder means, and
      (4) means for controlling a position of the rudder means in response to a sixth signal which is a function of the fourth command signal; and
   b. the control means includes means for adjusting the fifth signal and the sixth signal as a function of the speed of the aircraft on the ground so as to increase the amount of directional control provided by the nosewheel steering means relative to the rudder means as the speed of the aircraft decreases.

22. The control system as set forth in claim 16 wherein the selected navigational angle is a heading angle of the aircraft.

23. The control system as set forth in claim 16 wherein the control means includes (1) means for controlling the aircraft direction means so as to maintain the selected on-ground navigation angle as a track angle upon initial contact with the ground during landing, and (2) means for controlling the aircraft direction means so as to maintain the selected on-ground navigation angle as a heading angle during a remaining portion of the landing.

24. An airplane lateral flight control system comprising:
 a. at least one roll control input device operable by a pilot of said airplane;
 b. transducer means for generating a signal measuring the pilot's input to said roll control input device;
 c. roll control surface means for generating a rolling moment on said airplane in flight;
 d. first command generation means for generating a roll rate command from said signal generated by said transducer means;
 e. first maneuver control means for positioning said roll control surface means in such manner as to cause the aircraft's actual roll rate to follow said roll rate command;
 second comand generation means for generating a track rate command;
 g. second maneuver control means for positioning said roll control surface means in such manner as to cause the aircraft's actual track rate to tend to follow said track rate command, when the magnitude of a roll parameter is above a first threshold value and below a second threshold value;
 h. third command generation means for generating a track angle command; and
 i. third maneuver control means for positioning said roll control surface means in such manner as to cause the aircraft's actual track angle to tend to follow said track angle command, which third maneuver control means automatically becomes engaged when said signal has a value indicating that the pilot is not making an input to said roll control input device and when the magnitude of said roll parameter is below said first threshold value.

25. The airplane lateral flight control system as set forth in claim 24 wherein said first maneuver control means generates a preliminary roll command by integrating said roll rate command, and wherein said roll parameter is equal to said preliminary roll command.

26. The airplane lateral flight control system as set forth in claim 25 wherein:
 a. said second command generation means generates a track rate command by passing said preliminary roll command through a filter and a muliplier wherein it is multiplied by the ratio of airplane gravitational acceleration to groundspeed; and
 b. said second maneuver control means includes means for generating a track rate error by subracting a signal indicative of airplane actual track rate from said track rate command; and
 c. the lateral flight control system additionally comprises means for generating a component of roll angle command from said track rate error.

27. The airplane lateral control system as set forth in claim 25 wherein:
 a. the lateral control system additionally comprises roll angle control means for positioning the control surfaces in such manner as to cause the airplane's actual roll angle to follow a roll angle command when the magnitude of said roll parameter is above said second threshold value, said roll angle control means further including a roll control inner loop feedback controller using roll angle as a feedback;
 b. said second maneuver control means includes means for replacing roll angle with an equivalent roll angle as a feedback in the roll control inner loop, which equivalent roll angle is synthesized from a signal indicative of track rate by (i) passing the signal indicative of track rate through a multiplier where it is multiplied by the ratio of airplane groundspeed to gravitational acceleration and (ii) by adding a roll angle bias if the airplane is in an asymmetric flight condition; and
 c. said roll angle command effectively functions as said track rate command when roll angle is replaced by equivalent roll angle as a feedback in the roll control inner loop.

28. The airplane lateral control system as set forth in claim 27 wherein said means for replacing roll angle with an equivalent roll angle comprises a switch which transmits equivalent roll angle in place of roll angle when said second maneuver control means is engaged.

29. The airplane lateral control system as set forth in claim 27 wherein said means for replacing roll angle with an equivalent roll angle comprises a summer which transmits a linear combination of roll angle and equivalent roll angle, with the coefficients multiplying roll angle and equivalent roll angle varying with preliminary roll command but always adding to one.

30. The airplane lateral control system as set forth in claim 26 wherein:
 a. said third maneuver control means generates a track hold roll command;
 b. the roll angle bias is obtained by (i) integrating the track hold roll command, multiplying by a degrees-to-radians conversion factor, and dividing by a time constant, (ii) subtracting a roll angle bias due to pedal sideslip and a roll angle bias due to engine-out from the result of step (i), and (iii) passing the result of step (ii) through a limiter and a radians-to-degrees conversion.

31. An airplane lateral flight control system comprising:
 a. at least one roll control input device operable by a pilot of said airplane;
 b. transducer means for generating a signal measuring the pilot's input to said roll control input device;
 c. roll control surface means for generating a rolling moment on said airplane in flight; and
 d. track angle hold means for positioning said roll control surface means in such manner as to cause the aircraft's actual track angle to tend to follow a track angle command, which track angle hold means automatically becomes engaged after a ground to air transition on takeoff if said signal measuring the pilot's input has a value indicating that the pilot is not making an input to said roll control input device, wherein said track angle command is initialized to the last value of a track angle command from an on-ground track/heading directional control system, at the time said track angle hold means is engaged.

32. An airplane lateral flight control system comprising:
 a. at least one roll control input device operable by a pilot of said airplane;

b. transducer means for generating a signal measuring the pilot's input to said roll control input device;

c. roll control surface means for generating a rolling moment on said airplane in flight;

d. track angle hold means for positioning said roll control surface means in such manner as to cause the aircraft's actual track angle to tend to follow a track angle command, which track angle hold means automatically becomes engaged when said signal measuring the pilot's input has a value indicating that the pilot is not making an input to said roll control input device and when the magnitude of said roll parameter is below a threshold value; and e. pilot vernier track controller means for the pilot to fine tune said track angle command.

33. The airplane lateral flight control system as set forth in claim 32 wherein said pilot vernier track controller means comprises a laterally movable thumb operable switch located on the pilot's roll controller.

34. A directional control system for controlling an airplane on the ground, comprising:

a. rudder pedals operably by a pilot of the airplane;

b. transducer means for generating a yaw command signal indicative of the pilot's input to the rudder pedals;

c. maneuver command generation means for generating a heading rate command from said yaw command signal and for generating a heading angle command by integrating the heading rate command;

d. yaw control effector means for generating a yawing moment on said airplane moving on the ground; and e. maneuver control means for positioning the yaw control effector means in such manner as to cause the aircraft's actual heading angle to follow the heading angle command.

35. The directional control system of claim 34 wherein the yaw control effector means includes nosewheel steering means.

36. The directional control system of claim 34 wherein the maneuver control means includes:

a. means for generating a heading error signal by subtracting a signal indicative of actual heading angle from the heading angle command; and b. proportional plus integral controller means for generating a command component to the yaw control effector means from the heading error signal.

37. The directional control system of claim 34 wherein the maneuver command generation means and the maneuver control means are operational for all times when the airplane is on the ground at speeds above a threshold speed, with the exception of a short time period immediately after airplane landing, during which the maneuver command generation means and the maneuver control means are not operational, but second maneuver command generation means for generating a track rate command from said yaw command signal and for generating a track angle command by integrating the track rate command and second maneuver control means for positioning the yaw control effector means in such manner as to cause the aircraft's actual track angle to follow the track angle command are operational in their place.

38. The directional control system of claim 37 wherein the track angle command is initialized to the last value of track angle command from an airplane lateral flight control system with in-air track angle hold means, when the second maneuver command generation means becomes operational immediately after airplane landing.

39. The directional control system of claim 37 wherein the track angle command is initialized to a signal indicative of airplane track angle passed through a filter when the second maneuver command generation means becomes operational immediately after airplane landing.

40. The directional control system of claim 37 wherein the heading angle command is initialized to a signal indicative of airplane heading angle passed through a filter when the maneuver command generation means first becomes operational.

41. The directional control system of claim 39 wherein the filter is a lead-lag filter.

42. A directional control system for controlling an airplane on the ground, comprising:

a. rudder pedals operable by a pilot of the airplane;

b. transducer means for generating a yaw command signal indicative of the pilot's input to the rudder pedals;

c. maneuver command generation means for generating a track rate command from said yaw command signal and for generating a track angle command by integrating the track rate command;

d. yaw control effector means for generating a yawing moment on said airplane moving on the ground; and e. maneuver control means for positioning the yaw control effector means in such manner as to cause the aircraft's actual track angle to follow the track angle command.

43. The directional control system of claim 42 wherein the yaw control effector means comprises at least one rudder.

44. A directional control system for controlling an airplane on the ground, comprising:

a. rudder pedal operable by a pilot of the airplane;

b. yaw control effector means for generating a yawing moment on the airplane moving on the ground;

c. means for the pilot to control the yaw control effector means and thereby control the directional motion of the airplane on the ground through inputs to the rudder pedals;

d. heading angle command generation means for generating a heading angle command when the pilot is making no input to the rudder pedals; and e. heading angle hold means for positioning the yaw control effector means in such manner as to cause the aircraft's actual heading angle to follow the heading angle command when the pilot is making no input to said rudder pedals.

45. A directional control system for controlling an airplane on the ground, comprising:

a. rudder pedals operable by a pilot of the airplane;

b. yaw control effector means for generating a yawing moment on the airplane moving on the ground;

c. means for the pilot to control the yaw control effector means and thereby control the directional motion of the airplane on the ground through inputs to the rudder pedals;

d. track angle command generation means for generating a track angle command when the pilot is making no input to the rudder pedals; and e. track angle hold means for positioning the yaw control effector means in such manner as to cause the aircraft's actual track angle to follow the track angle command when the pilot is making no input to the rudder pedals.

46. The directional control system of claim 42 wherein the maneuver control means includes:
a. means for generating a track error signal by subtracting a signal indicative of actual track angle from the track angle command; and
b. proportional plus integral controller means for generating a command component to the yaw control effector means from the track error signal.

47. The directional control system of claim 46 further comprising yaw damping means using a yaw rate feedback signal for damping yawing motions of said airplane while it is on the ground.

* * * * *

UNITED STATES PATENT AND TRADEMARK OFFICE
CERTIFICATE OF CORRECTION

PATENT NO. : 5,008,825

DATED : April 16, 1991

INVENTOR(S) : Nadkarni et al.

It is certified that error appears in the above-identified patent and that said Letters Patent is hereby corrected as shown below:

On the title page:

Insert after "Inventors: Arun A. Nadkarni, 12836 NE. 135th St., Kirkland, Wash. 98034; Mithra M. K. V. Sankrithi, 4554 143rd Ave., SE., Bellevue, Wash. 98006 the following:

- - Assignee: The Boeing Company, Seattle, Wash. - -.

Signed and Sealed this

Seventh Day of April, 1992

Attest:

HARRY F. MANBECK, JR.

*Attesting Officer*        *Commissioner of Patents and Trademarks*